United States Patent
Guo et al.

(10) Patent No.: US 8,676,144 B2
(45) Date of Patent: Mar. 18, 2014

(54) ADAPTIVE INTERFERENCE NULLING FOR MIMO RECEIVER BASED ON INTERFERENCE CHARACTERISTICS

(75) Inventors: Li Guo, Irving, CA (US); Hang Jin, Plano, TX (US); Paul J. Stager, Akron, OH (US); Neil R. Diener, Hudson, OH (US); Matthew A. Silverman, Shaker Heights, OH (US); Chandra Vaidyanathan, Rockville, MD (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 13/086,643

(22) Filed: Apr. 14, 2011

(65) Prior Publication Data

US 2012/0264388 A1 Oct. 18, 2012

(51) Int. Cl.
    *H04B 1/10* (2006.01)
(52) U.S. Cl.
    USPC .......... 455/307; 455/303; 455/306; 455/63.1; 375/346; 375/349; 375/350
(58) Field of Classification Search
    USPC ............... 455/307, 303, 306; 375/346–350
    See application file for complete search history.

(56) References Cited

U.S. PATENT DOCUMENTS

| | | | |
|---|---|---|---|
| 6,714,605 B2 | 3/2004 | Sugar et al. | |
| 6,807,405 B1 * | 10/2004 | Jagger et al. | 455/296 |
| 6,850,735 B2 | 2/2005 | Sugar et al. | |
| 6,941,110 B2 | 9/2005 | Kloper et al. | |
| 7,035,593 B2 | 4/2006 | Miller et al. | |
| 7,079,812 B2 | 7/2006 | Miller et al. | |
| 7,116,943 B2 | 10/2006 | Sugar et al. | |
| 7,171,161 B2 | 1/2007 | Miller | |
| 7,184,777 B2 | 2/2007 | Diener et al. | |
| 7,224,752 B2 | 5/2007 | Sugar et al. | |
| 7,254,191 B2 | 8/2007 | Sugar et al. | |
| 7,269,151 B2 | 9/2007 | Diener et al. | |
| 7,292,656 B2 | 11/2007 | Kloper et al. | |
| 7,408,907 B2 | 8/2008 | Diener | |
| 7,424,268 B2 | 9/2008 | Diener et al. | |
| 7,450,673 B2 | 11/2008 | Jin et al. | |
| 7,606,335 B2 | 10/2009 | Kloper et al. | |
| 7,801,239 B2 | 9/2010 | Jin et al. | |
| 7,924,957 B2 | 4/2011 | Jin | |
| 2004/0228426 A1 * | 11/2004 | Oh et al. | 375/346 |
| 2005/0009486 A1 * | 1/2005 | Al-Dhahir et al. | 455/213 |
| 2006/0022815 A1 * | 2/2006 | Fischer et al. | 340/505 |
| 2006/0109938 A1 * | 5/2006 | Challa et al. | 375/347 |
| 2007/0291866 A1 * | 12/2007 | Rajappan et al. | 375/267 |
| 2008/0039146 A1 | 2/2008 | Jin | |
| 2008/0130803 A1 * | 6/2008 | Chang et al. | 375/346 |
| 2009/0304095 A1 * | 12/2009 | Chauncey et al. | 375/260 |
| 2010/0303182 A1 * | 12/2010 | Daneshrad et al. | 375/346 |
| 2011/0075711 A1 * | 3/2011 | Hasegawa | 375/147 |
| 2011/0150051 A1 * | 6/2011 | Stojanovic et al. | 375/219 |

* cited by examiner

*Primary Examiner* — Gennadiy Tsvey
(74) *Attorney, Agent, or Firm* — Edell, Shapiro & Finnan, LLC

(57) ABSTRACT

Interference in an unlicensed frequency band is spatially filtered out from received signals at a wireless device operating in the unlicensed frequency band. Energy received at a plurality of antennas of the wireless is device is analyzed to detect interference in the unlicensed frequency band. The detected interference is classified by type. Parameters for a nulling filter are generated or selected based on the type of interference detected in the received energy. During a time interval when it is expected to receive desired signals, the nulling filter is applied using the parameters to signals obtained from energy received at the plurality of antennas during the time interval.

15 Claims, 7 Drawing Sheets

ADAPTIVE INTERFERENCE NULLING FOR MIMO RECEIVER BASED ON INTERFERENCE CHARACTERISTICS

TECHNICAL FIELD

The present disclosure relates to interference mitigation in wireless communication networks.

BACKGROUND

An unlicensed frequency band is used for wireless communication, such as a WiFi™ network that operates in the 2.4 GHz band in the United States. Interference mitigation in a wireless network that operates in an unlicensed frequency is important due to the limited bandwidth and coexistence issues. For example, in addition to activity from WiFi networks, other devices that operate in the same unlicensed band include Bluetooth™ wireless devices, wireless video devices, etc. Non-WiFi activity in the unlicensed band can impair the performance of the wireless network operating in the same band.

DESCRIPTION OF EXAMPLE EMBODIMENTS

Overview

Interference in an unlicensed frequency band is spatially filtered out from received signals at a wireless device operating in the unlicensed frequency band. Energy received at a plurality of antennas of the wireless is device is analyzed to detect interference in the unlicensed frequency band. The detected interference is classified by type. Parameters for a nulling filter are generated or selected based on the type of interference detected in the received energy. During a time interval when it is expected to receive desired signals, the nulling filter is applied using the parameters to signals obtained from energy received at the plurality of antennas during the time interval.

Example Embodiments

Figure 1:
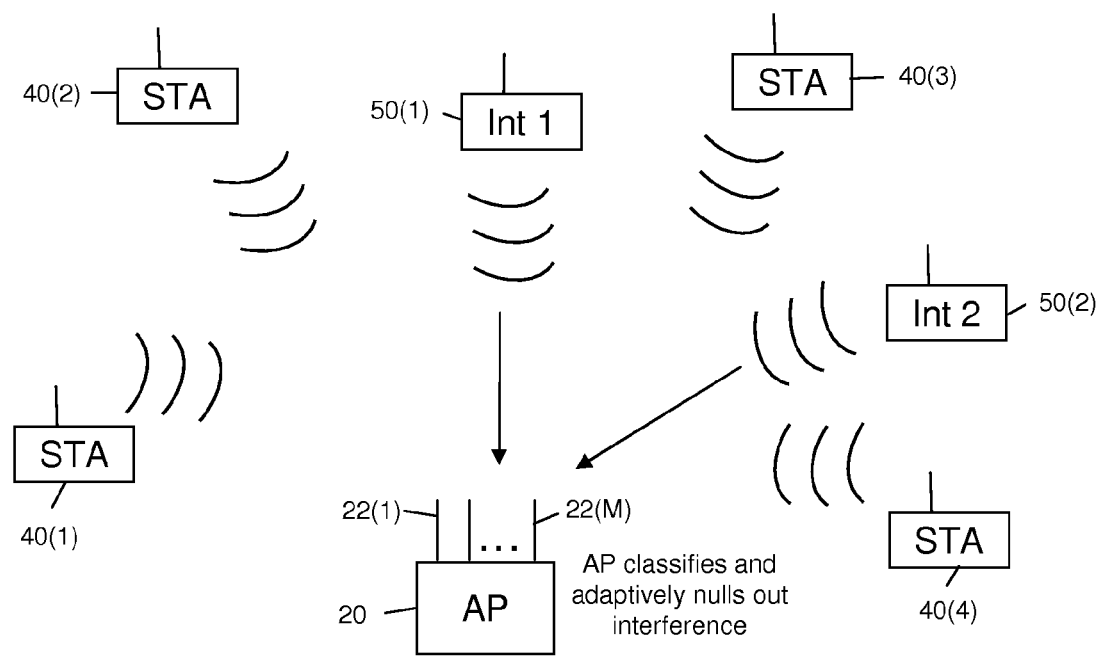
FIG. 1 is a diagram depicting an example of a wireless network operating in an unlicensed frequency band where interfering devices also operate, and in which a wireless access point is configured to classify and adaptively null out interference detected in received energy.

Referring first to FIG. 1, a wireless communication network is shown generally at reference numeral 10, comprising a wireless access point (AP) 20 and a plurality of wireless stations (STAs) 40(1)-40(4). The AP may serve more than four STAs but for purposes of the examples described herein, FIG. 1 shows only four STAs. The AP 20 and STAs 40(1)-40(4) are configured to operate in accordance with a wireless network communication protocol or standard, such as the IEEE 802.11 wireless local area network (WLAN) communication protocol, also known as a WiFi™ network. Another term for a STA in IEEE 802.11 parlance is a wireless client device or simply a "client."

Since an IEEE 802.11 WLAN operates in an unlicensed frequency band, e.g., the 2.4 GHz band in the United States, there is a strong possibility that other devices that are configured to operate in the unlicensed frequency band may be active and interfere with the operation of the WLAN. To this end, FIG. 1 shows interference (Int) devices Int 1 at 50(1) and Int 2 at 50(2). Examples of such interference devices are those that operate with in accordance with the Bluetooth™ wireless communication protocol, such as Bluetooth wireless headsets, wireless video communication devices (e.g., wireless video cameras). Other devices that can generate interference in the 2.4 GHz unlicensed band are microwave ovens.

Recent and next generation wireless networks in the unlicensed band use multiple-input multiple-output (MIMO) techniques to increase throughput and performance. A MIMO-capable wireless device has multiple antennas. Consequently, interference suppression (nulling) techniques can be used to suppress the interference from non-WiFi signals in the unlicensed band.

To this end, the AP 20 has a plurality of antennas 22(1)-22(M) and is configured to use MIMO wireless communication devices to improve throughput and performance when communication with the STAs 40(1)-40(4). Consequently, when the AP 20 detects energy in the unlicensed band, it detects such energy separately on each of the plurality of antennas 22(1)-22(M). It can therefore obtain a spatial view of the received energy, and use receive signal processing techniques, such as spatial nulling, to improve receive signal processing performance with respect to signals the AP 20 receives.

According to the techniques described herein, the AP 20 is configured to detect interference, classify it (by type), and select appropriate interference nulling parameters based on the type of interference detected to null out the interference but maintain proper reception of desired signals, from one or more of the STAs 40(1)-40(4). The nulling operation is performed prior to supplying the received signals from the plurality of antennas 22(1)-22(M) to a baseband MIMO receiver so that the baseband MIMO receiver operates on a "cleaner" set of signals for better signal reception. Nulling is a spatial filtering operation in which the pass band is the complementary space (null space) of the interference. In one embodiment, the null space is constructed from the eigenvectors of an interference covariance matrix, as described further hereinafter.

Spectrum intelligence information is generated that indicates whether an interferer is present, the type of interferer detected, and optionally samples of the interferer, e.g., In-phase (I) and Quadrature-phase (Q) samples. Thus, the spectrum intelligence information may comprise {interferer present, type of interferer, I/Q samples of interferer}. This spectrum intelligence information is used to select appropriate nulling parameters (coefficients or weights) used by a receive spatial nulling filter to suppress the interference while having no impact on the desired receive signals. There are no techniques heretofore known that use interference classification to guide interference nulling. The nulling filter is applied to signals received across the plurality of antennas to spatially null out any detected interference.

Figure 2:
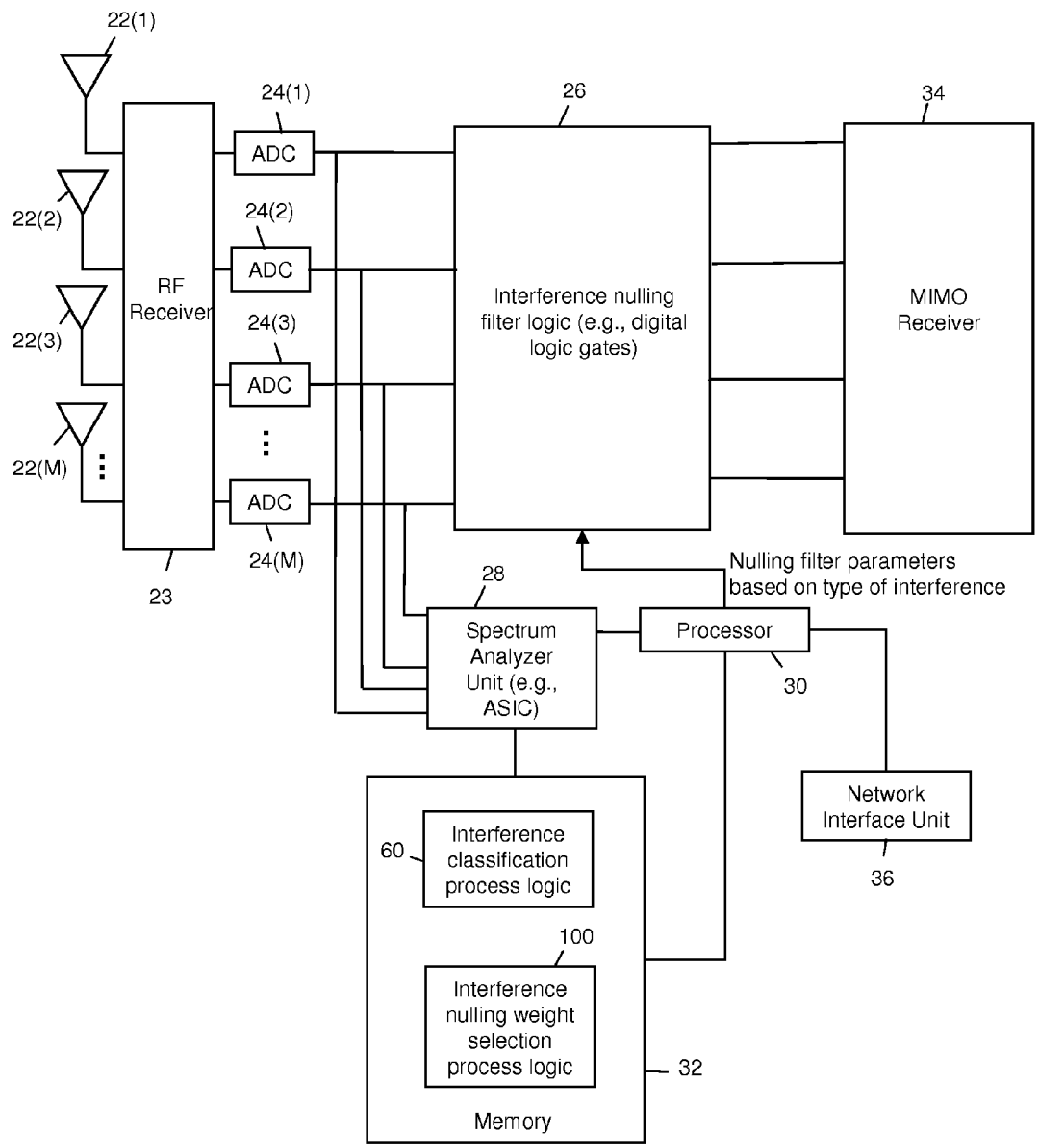
FIG. 2 is a block diagram showing an example of a wireless device, e.g., a wireless access point device, configured to classify and adaptively null out interference.

Reference is now made to FIG. 2 for a description of a block diagram of AP 20 that is configured to perform the spectrum intelligence-guided interference nulling techniques. The AP comprises the plurality of antennas 22(1)-22(M), an RF receiver 23, a plurality of analog-to-digital converters (ADCs) 24(1)-24(M), interference nulling filter logic 26, a spectrum analyzer unit 28, a processor 30, memory 32, a MIMO receiver 34 and a network interface unit 36. The RF receiver 23 comprises radio receiver circuitry to downconvert energy detected by the antennas 22(1)-22(M). The circuitry in the RF receiver 23 is not germane to the spectrum intelligence-guided interference nulling techniques and is therefore not shown and described in detail. The ADCs 24(1)-24(M) convert the downconverted analog signals from the respective antennas 22(1)-22(M) to antenna-specific digital signals. The antenna-specific digital signals output by the ADCs 24(1)-24(M) are supplied to the interference nulling filter logic 26 and to the spectrum analyzer unit 28. As explained further hereinafter, the interference nulling filter logic 26 applies an interference nulling filter to the antenna-specific digital signals prior to processing by the MIMO receiver 34. The MIMO receiver 34 performs baseband processing and demodulating of the filtered signals output by the interference nulling filter logic 26 to recover data carried by those signals. The MIMO receiver 34 may be an off-the-shelf WiFi MIMO baseband receiver chip or chipset, and the nulling filter operations are completely transparent to the operations of the MIMO receiver 34, such as maximal ratio combining, demodulation, etc. The MIMO receiver 34 may be configured to process orthogonal frequency division multiplexed (OFDM) baseband signals according to the IEEE 802.11n standard, for example. The network interface unit 36 enables connectivity, e.g., Ethernet connectivity, over a wired network so that the AP can communicate over a local area network and wide area network. In one form, the interference nulling filter logic 26 and spectrum analyzer unit 28 may be implemented by digital logic gates in one or more application specification integrated circuits (ASICs). In another form, the interference nulling filter logic 26 and spectrum analyzer unit 28 are implemented in software stored in memory 32 and executed by processor 30.

The parameters of the interference nulling filter logic 26 are determined based on the type of interference detected. To this end, the spectrum analyzer unit 28 receives the antenna-specific digital signals output by the ADCs 24(1)-24(M) and generates spectrum analysis data including characteristics of signal pulses (duration, center frequency, bandwidth, duty cycle) etc., as well as raw I and Q samples of received signals for a period of time. The processor 30 executes interference classification process logic 60 encoded or stored in memory 32 to classify and assign a type or name to any interference contained in received energy associated with the antenna-specific digital signals based on the spectrum analysis data output by the spectrum analyzer unit. For example, the spectrum analyzer unit 28 and interference classification process logic 60 may be implemented using the hardware and software capabilities found in the Cisco Spectrum Expert™ sensor devices or the CleanAir™ technology in the Cisco Aironet 3500 Series Access Point devices. In addition, other examples of the spectrum analyzer unit 38 and interference classification process logic 60 are described in U.S. Pat. Nos. 6,714,605; 7,254,191; 7,292,656; 6,850,735; 7,171,161; and 7,035,593. The processor 30 executes interference nulling weight selection process logic 100 to generate or select nulling filter characteristics or parameters to be used by the interference nulling filter logic 26 based on the type of interference detected by the interference classification process logic 60. The processor 30 is a microprocessor or microcontroller device, for example.

The memory 32 is a memory device and may comprise read only memory (ROM), random access memory (RAM), magnetic disk storage media devices, optical storage media devices, flash memory devices, electrical, optical, or other physical/tangible memory storage devices. Thus, in general, the memory 32 may comprise one or more computer readable storage media (e.g., a memory device) encoded with software comprising computer executable instructions and when the software is executed (by the processor 30) it is operable to perform the operations described herein in connection with process logic 100.

Figure 3:
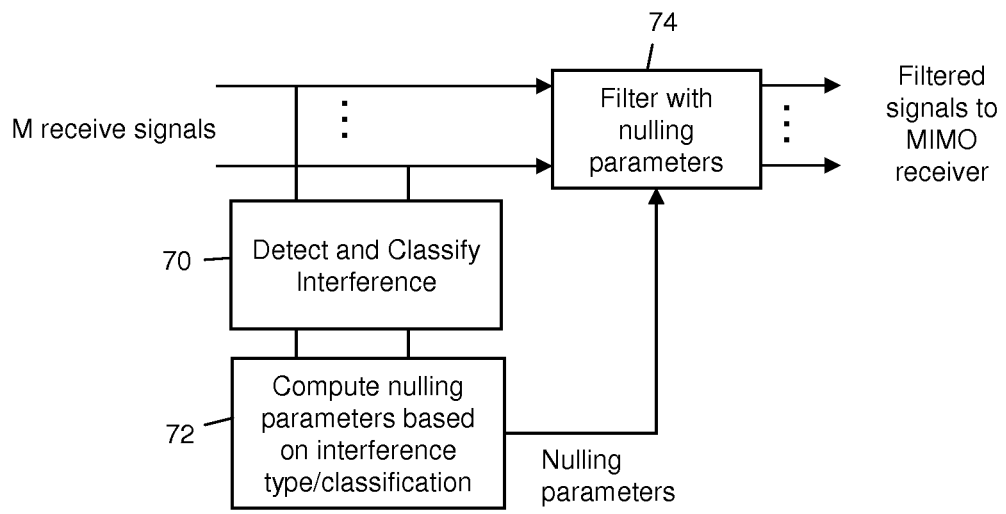
FIG. 3 is a diagram generally depicting operations of the wireless device in adaptively nulling out interference based on the type of interference.

Reference is now made to FIG. 3 for a description of a general flow of the operations associated with the spectrum intelligence-guided interference nulling process. M receive signals from M plurality of antennas on the AP are converted to digital signals and at 70, these signals are analyzed to detect and ultimately classify any detected interference. At 72, nulling parameters (e.g., nulling coefficients or weights) are computed or selected based on the type of interference detected. The nulling parameters are used at 74 to apply a nulling filter to the M received signals. The filtered signals (with any interference suppressed) are supplied for further processing by the MIMO receiver.

Figure 4:
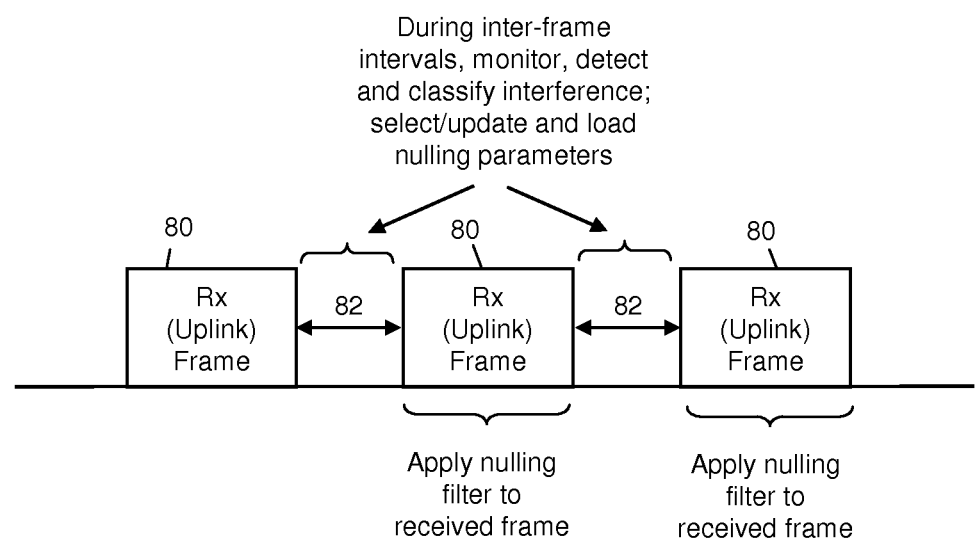
FIG. 4 is a diagram illustrating timing for analyzing received energy to detect and classify interference and for applying a nulling filter to received signals associated with a received frame.

FIG. 4 shows an example of the timing associated with the radio frequency (RF) monitoring and interference classification performed to adapt or update nulling parameters for use when processing received signals. In a WLAN, signals are sent from the AP to one or more STAs and from a STA to the AP during designated frames. For example, as shown in FIG. 4, there are designated uplink time intervals allocated for uplink frames to be transmitted from a STA to the AP. These uplink frame intervals are shown at 80. There are inter-frame time intervals or spacings during which, in general, no WLAN device is transmitting. The inter-frame time intervals are shown at 82. The AP is configured to analyze output of the spectrum analysis unit 23 to detect and classify any detected interference, and if interference is detected, generate, select or update the nulling parameters depending on the type of interference detected. The processor 30 supplies (loads) the nulling parameters to the interference nulling filter logic 26 prior to the next expected uplink frame to be received by the AP in order to use the updated nulling parameters when applying the nulling filter to signals received during that uplink frame interval. This process repeats to monitor any changes in interference conditions during inter-frame intervals to update the nulling parameters adaptively according to changing interference conditions. The monitoring need not be performed in every inter-frame interval, but, for example, during a certain number of inter-frame intervals over a predetermined period of time.

Figure 5:
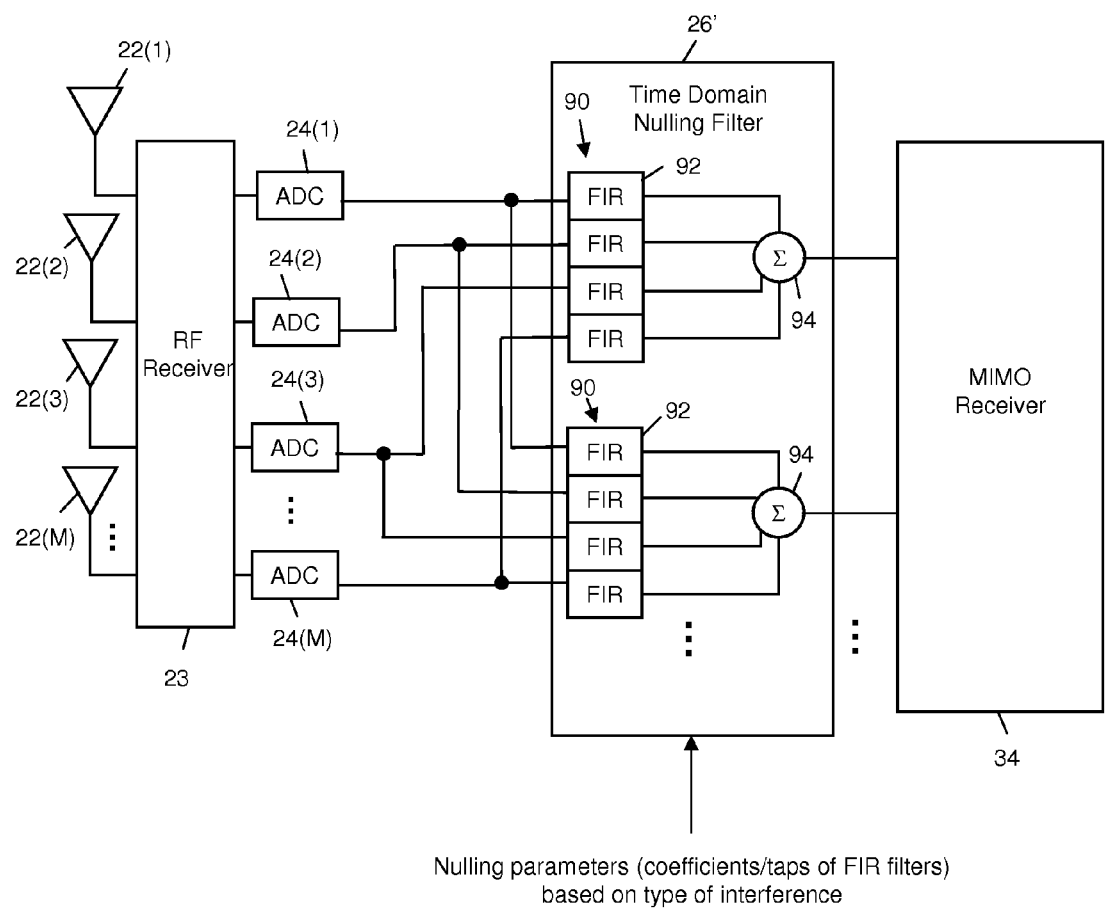
FIG. 5 is a block diagram illustrating an example of a time domain nulling filter configuration.

The interference nulling filter logic 26 may be implemented in the time domain or frequency domain. FIG. 5 illustrates an example of a configuration of time domain interference nulling filter logic 26'. Time domain interference nulling filter logic 26' comprises a plurality of finite impulse response (FIR) filter blocks 90(1)-90(M), one block for each antenna, and each block comprising M FIR filters 92. The outputs of the FIR filters within each filter block are added by a corresponding summer 94, and the output of the summer corresponds to a filtered output signal that is supplied to the MIMO receiver 34. In this implementation of the nulling filter logic, the nulling parameters comprise tap weights or filter coefficients that define the impulse response of the FIR filters 92 in the respective filter blocks 92(1)-92(M). The outputs of the summers 94 may be converted to the frequency domain by Fast Fourier Transform (FFT) circuits (not shown).

Figure 6:
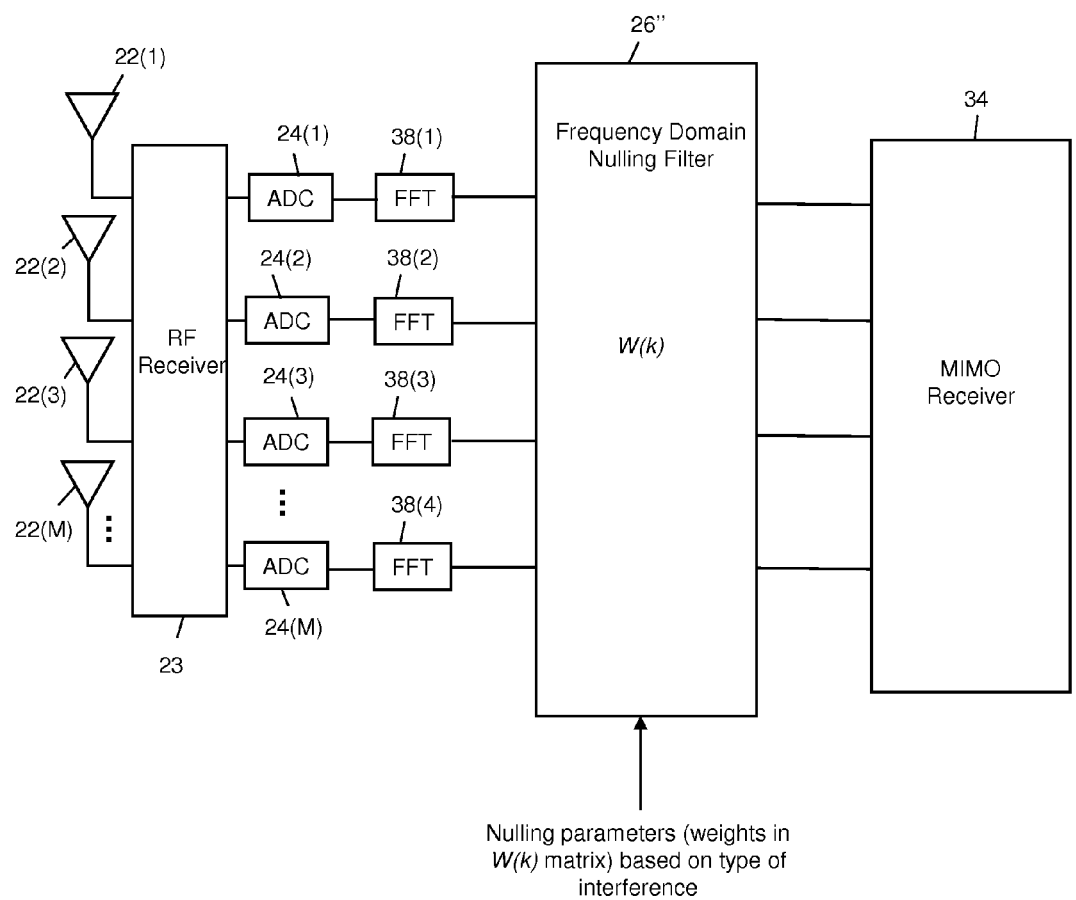
FIG. 6 is a block diagram illustrating an example of a frequency domain nulling filter configuration.

FIG. 6 illustrates an example of a configuration of frequency domain interference nulling filter logic 26". In this implementation, the outputs of the ADCs 24(1)-24(M) are supplied to FFT circuits 38(1)-38(M) to convert the antenna-specific digital signals to the frequency domain. The frequency domain interference nulling filter logic 26" applies an interference nulling matrix W(k), where k is a frequency subcarrier index. The nulling parameters in this example consist of weights of the interference nulling matrix W(k).

Figure 7:
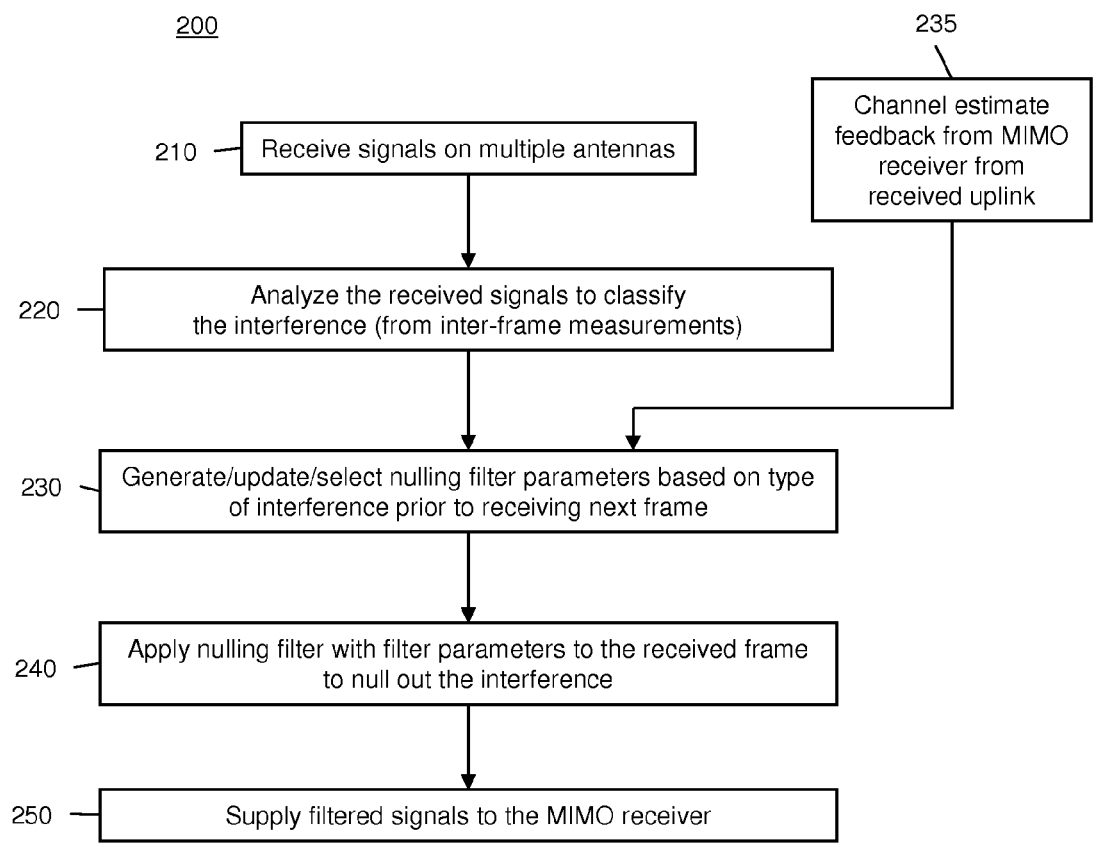
FIG. 7 is a flow chart illustrating examples of operations performed in the wireless device to classify and adaptively null out interference.

Reference is now made to FIG. 7 for a description of a flow chart that depicts operations of the AP 20 in the performing the spectrum intelligence-guided interference nulling process 200. Some of the operations of the flow chart in FIG. 7 are operations associated with hardware components of the AP 20, e.g., the RF receiver 23, the spectrum analyzer unit 28, and other operations are associated with the interference classification process logic 60 and interference nulling weight selection process logic 100. At 210, the AP 20 receives signals on its plurality of antennas 22(1)-22(M), and these signals are downconverted and converted to digital signals, specific to each antenna, corresponding to the aforementioned antenna-specific digital signals. At 220, the spectrum analyzer unit 28 analyzes the antenna-specific digital signals to generate spectrum analysis data that is used by the interference classification process logic 60 to classify the interference. The interference classification process logic 60 may generate a type or a name for a detected interferer, such as a Bluetooth headset, wireless video camera, Bluetooth data device, constant frequency interferer, etc. As is known in the art, a Bluetooth system includes a master unit and a slave unit that communicate using a frequency hopping scheme. When a frequency hopping interferer is detected, the monitoring and analyzing operation 220 may involve monitoring a plurality of frequencies in order to capture and analyze energy on all potential hop frequencies. By contrast, a wireless video camera operates on a fixed frequency. Thus, the type of interference detected can be used to adapt the nulling filter applied to null out that interference from desired signals.

At 230, based on the type of interference detected at 220, the interference nulling weight selection process logic 100 generates/updates/selects nulling filter parameters prior to receiving the next uplink frame. The filter parameters may consist of coefficients/taps in the case of a time domain nulling filter (FIG. 5) or weights for a nulling filter matrix (FIG. 6). In addition, as shown at 235, channel estimation feedback from the MIMO receiver 34 may be used in deriving the nulling filter parameters at 230. For example, the nulling filter parameters may be adjusted based on receive channel estimate information to take into consideration channel conditions for an outdoor line-of-sight (LOS) channel with potentially correlated channels along an azimuth angle or indoor channel conditions that are uncorrelated with wide angle-of-arrival (AoA) characteristics. The nulling filter parameters are loaded to the nulling filter process logic 26 prior to the receiving the next uplink frame.

Again, examples of types of interference are: frequency-hopping interference (e.g., a Bluetooth device), persistent interference transmissions (e.g., from wireless video devices) and WiFi-like interference (devices using the IEEE 802.11 wireless protocol). Different nulling filter parameters are computed for different interferer types. When the detected interferer is classified as a frequency-hopping device, a longer dwell is used for capturing received signals in all interfering frequencies in order to confirm that it is a persistent interference source and not interference that has come and gone on a channel. The interference cancellation weights need to be calculated from data received over time and across a plurality of frequencies, and the superposition of multiple interference information captures (across time and frequency) are used to calculate the nulling interference weight matrix for frequency hopping interference. When the detected interferer is classified as a microwave oven, then it is known that the interference is stationary and primarily will occur at fixed times during the day. As a result, the interference nulling can be applied at fixed times during the day. Moreover, the latest reliable interference capture may be used for computing the interference nulling matrix for a persistent interferer.

Generally, different interference nulling algorithms will converge more accurately and quickly when applied to the right type of signals. For example, a constant modulus beamformer/nulling filter matrix should be applied to constant modulus interferers (e.g., microwave ovens, wireless video signals, etc.). Furthermore, classification can be used to separate multiple sources of interference in order to apply different nulling filters to each interferer and/or to identify the worst type interferer in order to generate parameters for a nulling filter to null out the worst interferer among a plurality of detected interferers.

Operations 210-230 are performed for energy received by the AP during inter-frame intervals when it is expected that there are no transmissions occurring in the WLAN. Therefore, the spectrum analysis and interference classification operations are performed on data derived from energy that could not be energy from WLAN transmissions associated with the AP or its STAs. In other words, the interference characterization is based on energy received between WLAN packets, e.g., IEEE 802.11 packets, to set the parameters of the nulling filter to be used on received IEEE 802.11 packets.

The rank of the nulling filter, in the case of a frequency domain nulling filter as depicted in FIG. 6, may be reduced to be less than the number of receive antennas, i.e., M−1, to avoid a 'keyhole' channel effect on the desired signals. The keyhole effect occurs when the MIMO channel capacity is low (i.e., comparable to the single-input single-output (SISO) capacity) even though the signals at the antenna elements are uncorrelated. This is related to scenarios where scattering around the transmitter and receiver lead to low correlation of the signals. In addition, the rank of the nulling filter can be reduced to simplify the hardware implementation, if desired or necessary.

At 240, the nulling filter, with the filter parameters updated and loaded at 230, is applied to the received signals from the plurality of antennas for the received frame to null out any interference contained in the received signals yet leave in tact the desired receive signals, i.e., a received uplink frame from one of the STAs. The nulling filter is a receive spatial filter that creates an antenna null in the direction of the interference since the interference is evaluated across multiple antennas of the AP. The nulling filter passes desired signals, e.g., IEEE 802.11 WLAN signals, while reducing the receive power of a targeted interferer by 20-30 dB. When reducing the interferer receive power by 20-30 dB, the nulling filter has no impact on the desired signals because the AP/client channel and AP/interferer channel are uncorrelated.

At 250, the filtered signals are then supplied to the MIMO receiver 34 where they are processed according to the normal MIMO receive processing.

Figure 8:
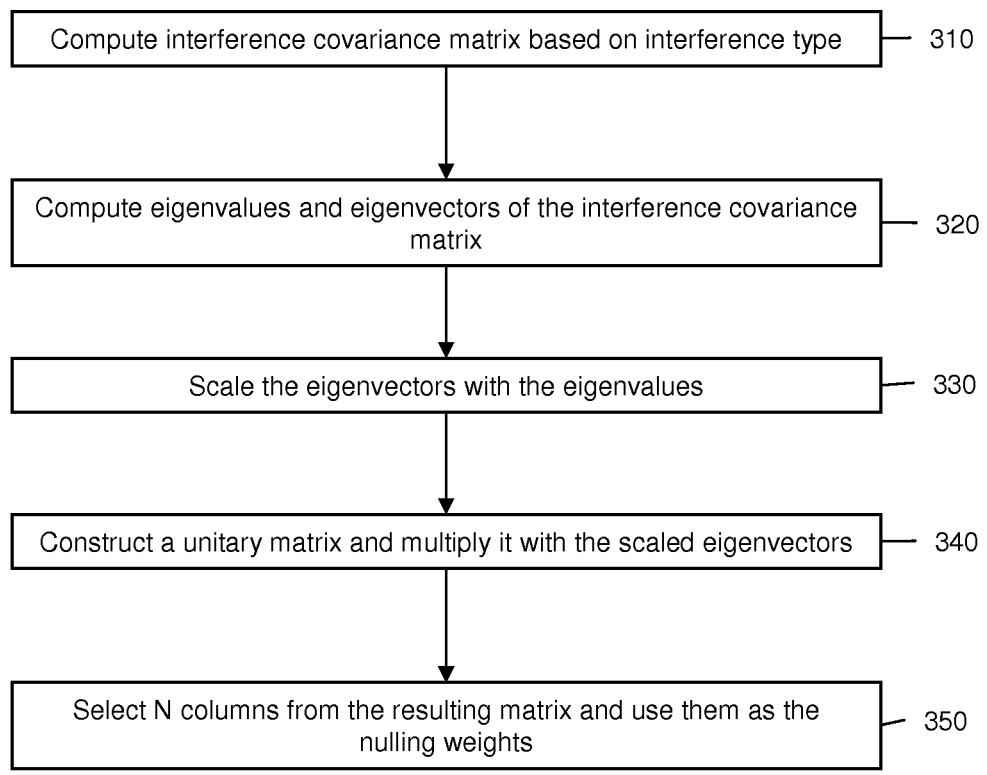
FIG. 8 is a flow chart illustrating examples of operations performed to generate nulling weights for a nulling filter.

Reference is now made to FIG. 8 for an example of a process 300 to generate nulling parameters according to one embodiment. The process 300 is performed by, for example, the interference nulling weight selection process logic 100, such as at operation 230 in the flow chart of FIG. 7. At 310, an interference covariance matrix is computed based on the interference type and from the interference detected during a inter-frame interval. The interference covariance matrix can also be computed from interference information extracted from a mixed signal in received packets, or other data that bears the interference characteristics. For example, the interference may be expressed as $y(t)=[y_1(t), y_2(t), \ldots y_m(t)]^T$ and each vector $y_i(t)$ is an M×1 interference vector. The covariance matrix is computed as $$\text{Cov} = \sum_n y_n(t) \times y_n^H(t),$$

where $^H$ is the Hermitian operation and n is an antenna index.

At 320, the eigenvalues and eigenvectors of the interference covariance matrix are computed. For example, the singular value decomposition of the interference covariance matrix is computed according to the computation:

$$SVD(\text{Cov}) = U \times \begin{bmatrix} \lambda_1 & 0 & \ldots & 0 \\ 0 & \lambda_2 & \ldots & 0 \\ \vdots & \vdots & \ddots & \vdots \\ 0 & 0 & \ldots & \lambda_M \end{bmatrix} \times V^H,$$

where U and V are eigenvector matrices of SVD(Cov), $\lambda_1, \lambda_2, \lambda_3, \ldots, \lambda_M$ are the eigenvalues of the interference covariance matrix and $^H$ is the Hermitian operation.

At 330, the eigenvector matrix U is scaled with the eigenvalues as $$U' = U \times \begin{bmatrix} \frac{1}{\sqrt{\lambda_1}} & 0 & \ldots & 0 \\ 0 & \frac{1}{\sqrt{\lambda_2}} & \ldots & 0 \\ \vdots & \vdots & \ddots & \vdots \\ 0 & 0 & \ldots & \frac{1}{\sqrt{\lambda_M}} \end{bmatrix}.$$

Operation 330 serves to condition the eigenvector matrix so that any maximal ratio combining performed in the MIMO receiver is biased towards interference suppression efficiently rather than signal power.

At 340, an M×M unitary matrix is constructed and multiplied with the scaled eigenvectors $[\vec{q}_1, \vec{q}_2, \ldots, \vec{q}_N]$. At 350, the N columns of the resulting matrix are selected and used as nulling weights of the interference nulling weight matrix W(k) as shown in FIG. 6. That is, $W=U' \times [\vec{q}_1, \vec{q}_2, \ldots, \vec{q}_N]$. The unitary matrix will preserve the power ratios set by the operation 330 and also help to balance the signal power among different receiver data streams. The interference nulling weigh matrix W(k) is applied to the received signals (associated with a received uplink frame) mathematically by the computation $W(k)^H \times R$ where $^H$ is the Hermitian operation and R is the received signal vector across the plurality of receive antennas of the AP.

Simulations have shown that spatial filtering does not perform well when applied after a maximal ratio combining operation. This is because each dimension represented by an eigenvector has a different nulling efficiency and this cannot be factored in maximal ratio combining, whereas nulling is transparent to maximal ratio combining. Moreover, maximal ratio combining tends to put more weight on the signal power, and in the cases of strong interference, the dimension that has less nulling efficiency will contribute more to the final result. By applying interference nulling prior to maximal ratio combining (performed in the MIMO receiver) a much better nulling efficiency (signal-to-noise gain) than a conventional nulling scheme.

In sum, a method is provided comprising, at a wireless device, analyzing energy received at a plurality of antennas in an unlicensed frequency band to detect interference in the unlicensed frequency band; determining the type of interference detected in the received energy; generating parameters for a nulling filter based on the type of interference detected in the received energy; and during a time interval when it is expected to receive desired signals, applying the nulling filter using the parameters to signals obtained from energy received at the plurality of antennas during the time interval.

In addition, an apparatus is provided comprising a plurality of antennas; a radio receiver coupled to the plurality of antennas and configured to downconvert signals detected by the plurality of antennas in an unlicensed frequency band; a spectrum analyzer unit configured to analyze signals output by the radio receiver for at least one antenna to detect interference in the unlicensed frequency band; and a processor coupled to the spectrum analyzer unit and configured to: determine a type of interference detected in the signals; generate parameters for a nulling filter based on the type of interference detected in the received energy; and during a time interval when it is expected to receive desired signals, apply the nulling filter using the parameters to signals obtained from energy received at the plurality of antennas during the time interval.

Moreover, in another form, one or more computer readable storage media are provided encoded with software comprising computer executable instructions and when the software is executed operable to: analyze signals output by the radio receiver for at least one of a plurality of antennas of a wireless device in an unlicensed frequency band to detect interference in the unlicensed frequency band; determine the type of interference in the signals; generate parameters for a nulling filter based on the type of interference detected in the received energy; and during a time interval when it is expected to receive desired signals, apply the nulling filter using the parameters to signals obtained from energy received at the plurality of antennas during the time interval.

The above description is intended by way of example only. Various modifications and structural changes may be made therein without departing from the scope of the concepts described herein and within the scope and range of equivalents of the claims.

What is claimed is:

1. A method comprising:
   at a wireless device, analyzing energy received at a plurality of antennas in an unlicensed frequency band performed to detect interference in the unlicensed frequency band during first time intervals between reception of desired signals at the wireless device;
   determining the type of interference detected in the received energy during the first time intervals;
   generating parameters for a spatial nulling filter including a finite impulse response (FIR) filter based on the type of interference detected in the received energy during the first time intervals, wherein the generating comprises:
   generating FIR filter coefficients for the FIR filter, the FIR filter including multiple FIR filter blocks, one block for each antenna, and each block comprising multiple FIR filter sub-blocks, respective received signals obtained at the plurality of antennas to be supplied to a corresponding input of the multiple FIR filter sub-blocks in each filter block, and wherein outputs of the FIR filter sub-blocks in each filter block are added by a corresponding summer to produce a filtered signal from each filter block;

supplying the parameters, including the FIR filter coefficients, to the FIR filter of the nulling filter prior to a second time interval when the desired signals are to be received; and during the second time interval, applying in the time domain the FIR filter of the nulling filter to signals obtained from energy received at the plurality of antennas during the second time interval.

2. The method of claim 1, and further comprising adjusting the parameters based on receive channel estimate information.

3. The method of claim 1, wherein applying is performed prior to supplying signals from the respective antennas to a receiver unit that processes signals from the plurality antennas.

4. The method of claim 1, wherein generating comprises generating parameters for the nulling filter from superposition of data associated with energy received over time and across a plurality of frequencies for a frequency hopping interferer and generating a constant modulus nulling filter for a constant modulus interferer.

5. The method of claim 1, wherein generating comprises generating parameters for the nulling filter to null out a worst interferer among a plurality of detected interferers.

6. The method of claim 1, wherein the applying includes applying the FIR filter in order to null the interference from a spatial direction in the filtered signals.

7. The method of claim 5, wherein generating further comprises generating parameters for the nulling filter from superposition of data associated with energy received over time and across a plurality of frequencies for a frequency hopping interferer and generating a constant modulus nulling filter for a constant modulus interferer.

8. An apparatus comprising:
a plurality of antennas;
a radio receiver coupled to the plurality of antennas and configured to downconvert signals detected by the plurality of antennas in an unlicensed frequency band;
a spectrum analyzer unit configured to analyze signals output by the radio receiver for at least one antenna to detect interference in the unlicensed frequency band during first time intervals between reception of desired signals at the wireless device; and
a processor coupled to the spectrum analyzer unit and configured to:
determine a type of interference detected in the signals during the first time intervals;
generate parameters for a spatial nulling filter including a finite impulse response (FIR) filter based on the type of interference detected in the received energy during the first time intervals, wherein the generated parameters include FIR filter coefficients for the FIR filter, the FIR filter including multiple FIR filter blocks, one block for each antenna, and each block comprising multiple FIR filter sub-blocks, respective received signals obtained at the plurality of antennas to be supplied to a corresponding input of the multiple FIR filter sub-blocks in each filter block, and wherein outputs of the FIR filter sub-blocks in each filter block are added by a corresponding summer to produce a filtered signal from each filter block; and
during a second time interval when it is expected to receive the desired signals, apply in the time domain the FIR filter of the nulling filter to signals obtained from energy received at the plurality of antennas during the second time interval.

9. The apparatus of claim 8, wherein the processor is configured to adjust the parameters for the nulling filter based on receive channel estimate information.

10. The apparatus of claim 8, wherein the processor is configured to generate the parameters comprising weights of a matrix, and to apply the matrix in the frequency domain to the signals obtained from energy received at the plurality of antennas during the time interval.

11. The apparatus of claim 8, wherein the processor is configured to generate parameters for the nulling filter to null out a worst interferer among a plurality of detected interferers.

12. One or more non-transitory computer readable storage media encoded with software comprising computer executable instructions and when the software is executed operable to:
analyze signals output by a radio receiver for at least one of a plurality of antennas of a wireless device in an unlicensed frequency band to detect interference in the unlicensed frequency band during first time intervals between reception of desired signals at the wireless device;
determine the type of interference in the signals during the first time intervals;
generate parameters for a spatial nulling filter including a finite impulse response (FIR) filter based on the type of interference detected in the received energy during the first time intervals, wherein the generated parameters include FIR filter coefficients for the FIR filter, the FIR filter including multiple FIR filter blocks, one block for each antenna, and each block comprising multiple FIR filter sub-blocks, respective received signals obtained at the plurality of antennas to be supplied to a corresponding input of the multiple FIR filter sub-blocks in each filter block, and wherein outputs of the FIR filter sub-blocks in each filter block are added by a corresponding summer to produce a filtered signal from each filter block; and
during a second time interval when it is expected to receive the desired signals, apply in the time domain the FIR filter of the nulling filter to signals obtained from energy received at the plurality of antennas during the second time interval.

13. The computer readable storage media of claim 12, wherein the instructions that are operable to generate comprise instructions that are operable to generate weights of a matrix, and the instructions that are operable to apply comprise instructions that are operable to apply the matrix in the frequency domain to the signals obtained from energy received at the plurality of antennas during the time interval.

14. The computer readable storage media of claim 12, wherein the instructions that are operable to analyze comprise instructions operable to analyze received energy during time intervals between reception of desired signals.

15. The computer readable storage media of claim 12, wherein the instructions that are operable to generate comprise instructions that are operable to generate parameters for the nulling filter from superposition of data associated with energy received over time and across a plurality of frequencies for a frequency hopping interferer and generate a constant modulus nulling filter for a constant modulus interferer.

* * * * *